US009785725B2

(12) United States Patent
Srinivasan et al.

(10) Patent No.: US 9,785,725 B2
(45) Date of Patent: Oct. 10, 2017

(54) METHOD AND SYSTEM FOR VISUALIZING RELATIONAL DATA AS RDF GRAPHS WITH INTERACTIVE RESPONSE TIME

(71) Applicant: Oracle International Corporation, Redwood Shores, CA (US)

(72) Inventors: Jagannathan Srinivasan, Nashua, NH (US); Souripriya Das, Nashua, NH (US); Matthew Steven Perry, Brookline, NH (US); Juan Francisco Garcia Navarro, Zapopan (MX); Victor Antonio Lopez Villamar, Zapopan (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 365 days.

(21) Appl. No.: 14/498,709

(22) Filed: Sep. 26, 2014

(65) Prior Publication Data
US 2016/0092554 A1      Mar. 31, 2016

(51) Int. Cl.
*G06F 17/30* (2006.01)

(52) U.S. Cl.
CPC .. *G06F 17/30958* (2013.01); *G06F 17/30554* (2013.01)

(58) Field of Classification Search
CPC .............. G06F 17/30958; G06F 17/30554
See application file for complete search history.

(56) References Cited

U.S. PATENT DOCUMENTS

| | | |
|---|---|---|
| 5,852,822 A | 12/1998 | Srinivasan et al. |
| 5,893,104 A | 4/1999 | Srinivasan et al. |
| 6,128,610 A | 10/2000 | Srinivasan et al. |
| 6,351,742 B1 | 2/2002 | Agarwal et al. |
| 6,360,228 B1 | 3/2002 | Sundara et al. |
| 6,370,522 B1 | 4/2002 | Agarwal et al. |
| 6,401,083 B1 | 6/2002 | Agarwal et al. |
| 6,421,666 B1 | 7/2002 | Murthy et al. |
| 6,546,394 B1 | 4/2003 | Chong et al. |
| 6,708,178 B1 | 3/2004 | Chong et al. |
| 6,738,782 B2 | 5/2004 | Agarwal et al. |
| 6,816,853 B1 | 11/2004 | Agarwal et al. |
| 6,826,563 B1 | 11/2004 | Chong et al. |

(Continued)

OTHER PUBLICATIONS

Jana Bauckmann, et al. "Efficiently Detecting Inclusion Dependencies", ICDE 2007, 1448-1450, 3 pages.

(Continued)

*Primary Examiner* — Huawen A Peng
(74) *Attorney, Agent, or Firm* — Vista IP Law Group, LLP

(57) ABSTRACT

Systems and methods for visualizing relational data as RDF graphs in order to explore connections between data in the relational schema. The relational data is first converted into an initial RDF graph. Referential constraints between tables in the relational data, including unasserted referential constraints and pseudo-referential constraints, are automatically detected and used to augment the RDF graph. In addition, datatype properties in the RDF graph may be folded into annotation objects for better visualization. The resulting graph may be an edge-node graph, with edges corresponding to referential constraints between nodes corresponding to relational table rows.

33 Claims, 13 Drawing Sheets

(56) References Cited

U.S. PATENT DOCUMENTS

| | | |
|---|---|---|
| 6,859,808 B1 | 2/2005 | Chong et al. |
| 6,920,460 B1 | 7/2005 | Srinivasan et al. |
| 7,054,872 B1 | 5/2006 | Das et al. |
| 7,127,467 B2 | 10/2006 | Yalamanchi et al. |
| 7,328,209 B2 | 2/2008 | Das et al. |
| 7,617,235 B2 | 11/2009 | Srinivasan et al. |
| 7,680,862 B2 | 3/2010 | Chong et al. |
| 7,774,346 B2 | 8/2010 | Hu et al. |
| 7,809,674 B2 | 10/2010 | Chong et al. |
| 7,844,600 B2 | 11/2010 | Hu et al. |
| 7,870,174 B2 | 1/2011 | Eadon et al. |
| 7,953,728 B2 | 5/2011 | Hu et al. |
| 7,987,164 B2 | 7/2011 | Hu et al. |
| 8,015,180 B2 | 9/2011 | Hu et al. |
| 8,037,108 B1 * | 10/2011 | Chang .................. G06F 17/303 707/803 |
| 8,078,646 B2 | 12/2011 | Das et al. |
| 8,126,926 B2 | 2/2012 | Atre et al. |
| 8,214,354 B2 | 7/2012 | Chong et al. |
| 8,250,048 B2 | 8/2012 | Yalamanchi et al. |
| 8,401,991 B2 | 3/2013 | Wu et al. |
| 8,719,250 B2 | 5/2014 | Chong et al. |
| 8,768,931 B2 | 7/2014 | Das et al. |
| 8,782,017 B2 | 7/2014 | Das et al. |
| 9,098,566 B2 | 8/2015 | Srinivasan et al. |
| 9,229,930 B2 | 1/2016 | Sundara et al. |
| 9,244,981 B2 | 1/2016 | Yalamanchi et al. |
| 2003/0212670 A1 | 11/2003 | Yalamanchi et al. |
| 2004/0167874 A1 | 8/2004 | Chong et al. |
| 2005/0182762 A1 | 8/2005 | Srinivasan et al. |
| 2005/0216518 A1 | 9/2005 | Hu et al. |
| 2006/0036592 A1 | 2/2006 | Das et al. |
| 2006/0036633 A1 | 2/2006 | Chong et al. |
| 2006/0235823 A1 | 10/2006 | Chong et al. |
| 2006/0235837 A1 | 10/2006 | Chong et al. |
| 2007/0050381 A1 | 3/2007 | Hu et al. |
| 2007/0233641 A1 | 10/2007 | Chong et al. |
| 2008/0288446 A1 | 11/2008 | Hu et al. |
| 2008/0288473 A1 | 11/2008 | Hu et al. |
| 2009/0019005 A1 | 1/2009 | Hu et al. |
| 2009/0100089 A1 | 4/2009 | Eadon et al. |
| 2009/0177622 A1 | 7/2009 | Hu et al. |
| 2010/0036788 A1 | 2/2010 | Wu et al. |
| 2010/0036862 A1 | 2/2010 | Das et al. |
| 2010/0161680 A1 | 6/2010 | Atre et al. |
| 2010/0169966 A1 | 7/2010 | Yalamanchi et al. |
| 2010/0268722 A1 | 10/2010 | Yalamanchi et al. |
| 2012/0084271 A1 | 4/2012 | Das et al. |
| 2012/0117081 A1 | 5/2012 | Das et al. |
| 2012/0303668 A1 | 11/2012 | Srinivasan et al. |
| 2014/0059043 A1 | 2/2014 | Sundara et al. |
| 2014/0214857 A1 | 7/2014 | Srinivasan et al. |
| 2015/0205880 A1 | 7/2015 | Perry et al. |
| 2016/0092554 A1 | 3/2016 | Srinivasan et al. |

OTHER PUBLICATIONS

Seema Sundara et al. Visualizing Large-Scale RDF Data Using Subsets, Summaries, and Sampling in Oracle, ICDE 2010, 1048-1059, 12 pages.

* cited by examiner

METHOD AND SYSTEM FOR VISUALIZING RELATIONAL DATA AS RDF GRAPHS WITH INTERACTIVE RESPONSE TIME

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

There is currently a tremendous growth in highly connected data, which includes social network data (such as Twitter, Facebook, etc.), biological networks, scientific data, sensor network data, etc. Such connected data is often stored on traditional RDBMS/relational data systems.

The relational data may be organized into many parent-child or hierarchical relationships. For example, a data row in an employee table may map to a row in a department table. A row for an order may map to an order line, which in turn maps to a part which maps to a supplier which maps to a country. In traditional systems, in order to provide a visualization of the data, a query is written in order to perform a join of the data to be reported and displayed.

Thus, knowledge of the data schema is typically required. For example, if a user wants to see which employees are in which departments, they can write a database query to retrieve the requested information. The query cannot be written without knowledge of the underlying data schema (e.g., the relationship between the employee table and the departments table). However, in many instances a user may not be familiar with the underlying data schema, and may wish to be able to explore connections between data in the schema without having any prior knowledge.

RDF is a widely-used language that was originally developed for representing information (metadata) about resources in the World Wide Web. It may, however, be used for representing information about absolutely anything. When information has been specified using the generic RDF format, it may be consumed automatically by a diverse set of applications.

There are two standard vocabularies defined on RDF: RDF Schema (RDFS) and the Web Ontology Language (OWL). These vocabularies introduce RDF terms that have special semantics in those vocabularies. For simplicity, in the rest of the document, our use of the term RDF will also implicitly include RDFS and OWL. For more information and for a specification of RDF, see *RDF Vocabulary Description Language 1.0: RDF Schema*, available at www.w3.org/TR/rdf-schema/, *OWL Web Ontology Language Overview*, available at www.w3.org/TR/owl-features/, and Frank Manola and Eric Miller, *RDF Primer*, published by W3C and available in September, 2004 at www.w3.org/TR/rdf-primer/. The *RDF Vocabulary Description Language 1.0: RDF Schema, OWL Web Ontology Language Overview*, and *RDF Primer* are hereby incorporated by reference into the present patent application.

Facts in RDF are represented by RDF triples. Each RDF triple represents a fact and is made up of three parts, a subject, a predicate (sometimes termed a property), and an object. For example, the fact represented by the English sentence "John is 24 years old" can be represented in RDF by the subject, predicate, object triple <'John', 'age', '24'>, with 'John' being the subject, 'age' being the predicate, and '24' being the object. In the following discussion, the values in RDF triples are termed lexical values. For the purposes of this specification, an RDF triple may be expressed in the form of subject→#property→object (e.g., the triple <'John', 'age', '24'> may be expressed as John→#age→24).

A key challenge when visualizing relational data using RDF is how to make efficient use of screen space during visualization. In general relational data will grow by an order of magnitude when transformed into RDF data, as each cell of a table will be transformed into an RDF triple. For example, assuming no null values, a single table with 20 rows and 10 columns will be translated into 200 RDF triples.

In addition, many large scale RDF visualization tools require a materialized lexical-values-to-ID mapping table and a materialized ID-based RDF graph, and may rely on pre-computed ID-based summaries for speeding up visualization of RDF views over relational data. On the other hand, an RDF view arrived at by applying standard methods of RDF mapping (e.g., W3C RDB2RDF direct mapping) will only have lexical values, and no IDs, due to the data being directly generated at query time via mapping from the underlying relational store.

Another problem with visualizing RDF views over relational data using standard methods of direct mapping is that they are partitioning agnostic. When there is large scale relational data which has been partitioned by a database designer, it would be desirable to be able to take advantage of those partitioning schemes in visualizing the data, which with the current specification of W3C RDB2RDF direct mapping is not possible.

Therefore, there is a need for visualization techniques for relational data as a graph that facilitates exploration and discovery, yet can be produced with an interactive response time.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
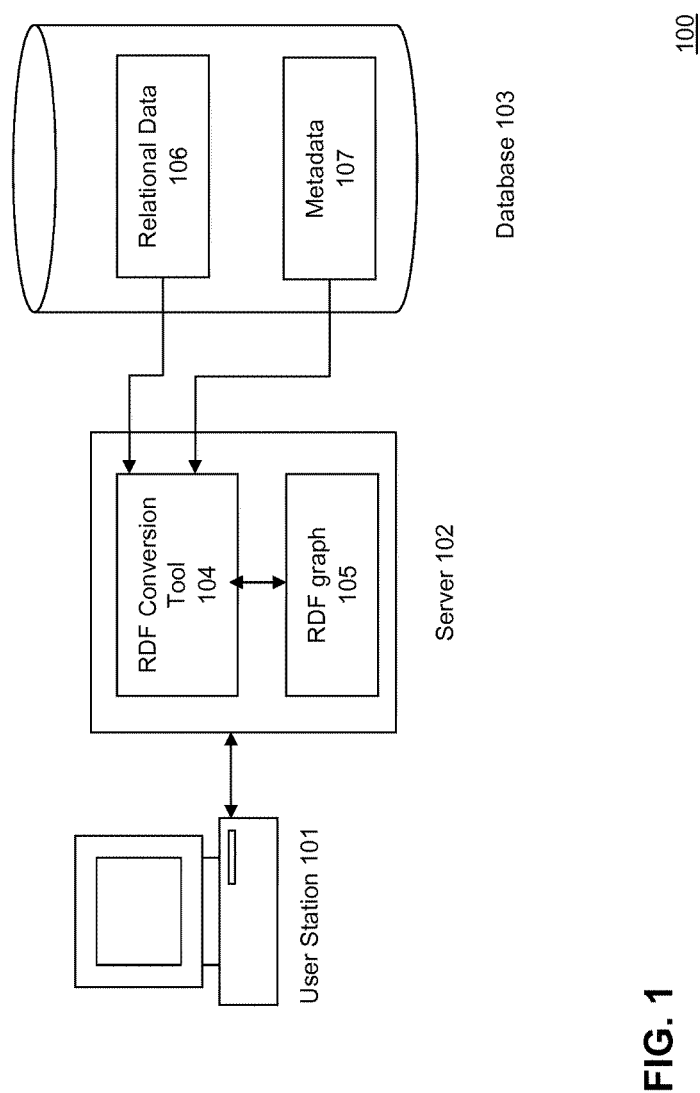
FIG. 1 illustrates an architecture of a system for generating RDF graphs from relational data, in accordance with some embodiments.

Embodiments of the invention provide an improved approach for generating and visualizing RDF graphs from relational data. Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

FIG. 1 shows an architecture of a system 100 in accordance with some embodiments. The users operate the system at a user station 101 to access and utilize applications and tools on a server 102. Such applications and tools may include a RDF conversion tool 104 for converting relational data 106 stored on a database 103 into an RDF graph 105, in order to allow users to visualize and explore the referential constraints between the data. In addition, metadata 107 associated with relational data 106 may be made available to RDF conversion tool 104 when creating RDF graph 105. For example, metadata 107 may contain data for partitioning schemes for relational data 106, which may be used by RDF conversion tool 104 for defining subsets of data to convert to an RDF graph. (e.g., a user may only which to view the RDF graph for data falling within a particular partition range).

In system 100, user station 101 comprises any type of computing station that may be used to operate or interface with a server 102. Examples of such user stations 101 include for example, workstations, personal computers, laptop computers, or remote computing terminals. User station 101 may also comprise any type of portable tablet device, including for example, tablet computers, portable readers, etc., or mobile device that can suitably access an application on application server 102, such as smartphones and programmable mobile handsets. User station 101 usually includes a display device, such as a display monitor or screen, for displaying scheduling data and interface elements to users. User station 101 may also comprise one or more input devices for the user to provide operational control over the activities of system 100, such as a mouse, touch screen, keypad, or keyboard. The users may correspond to any individual, organization, or other entity that uses system 100 to remotely access applications on application server 102, such as an SRM application, a marketing automation application, and/or tracking and analytics services on application server 102.

The database 103 may correspond to any type of computer readable media or storage devices. The computer readable storage devices comprise any combination of hardware and software that allows for ready access to the data within the database. For example, the computer readable storage device could be implemented as computer memory or disk drives operatively managed by an operating system.

Figure 2:
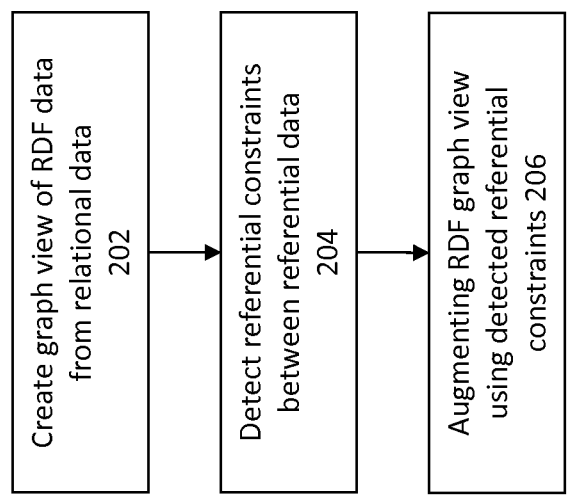
FIG. 2 illustrates a flowchart of a process for visualizing relational data as RDF graphs in accordance with some embodiments.

FIG. 2 illustrates a flowchart of a process for visualizing relational data as RDF graphs in accordance with some embodiments. At 202, the relational data is converted into an initial RDF graph. In some embodiments, this is accomplished by leveraging the existing W3C standards for RDB2RDF mapping. It is understood that in addition to the W3C RDB2RDF direct mapping, other types of mappings may be used, such as R2RML custom mapping.

At 204, referential constraints between tables in the relational data are detected and analyzed. These may include asserted referential constraints in the relational data (e.g., expressly represented in the metadata indicating a referential relationship between tables), as well as unasserted referential constraints. In some embodiments, unasserted referential constraints may be detected through a set of SPARQL queries performed on the RDF graph using a standard brute force Inclusion Dependency Detection algorithm. An example method for detecting unasserted referential constraints is disclosed in Jana Bauckmann, et al., "Efficiently Detecting Inclusion Dependencies," ICDE 2007: 1448-1450, which is hereby incorporated by reference in its entirety.

In some embodiments pseudo-referential constraints are also detected. Pseudo-referential constraints may refer to multi-value properties that are depicted as referential constraints in the relational data, due to the normalization process of the relational data. For example, the relational data may contain a table of employees, where each employee may have multiple hobbies. Due to multiple hobbies being able to correspond to a single employee, the hobbies may be stored in a separate relational table from the employee table, where each hobby is mapped to an employee.

At 206, the RDF graph is augmented using the detected referential constraints. For example, the graph may be modified such that unasserted referential constraints will appear as edges between subject instances, and pseudo-referential constraints as multi-valued properties in the RDF graph. The resulting graph may be an edge-node graph, with each edge corresponding to a referential constraint between nodes corresponding to relational table rows.

Figure 3:
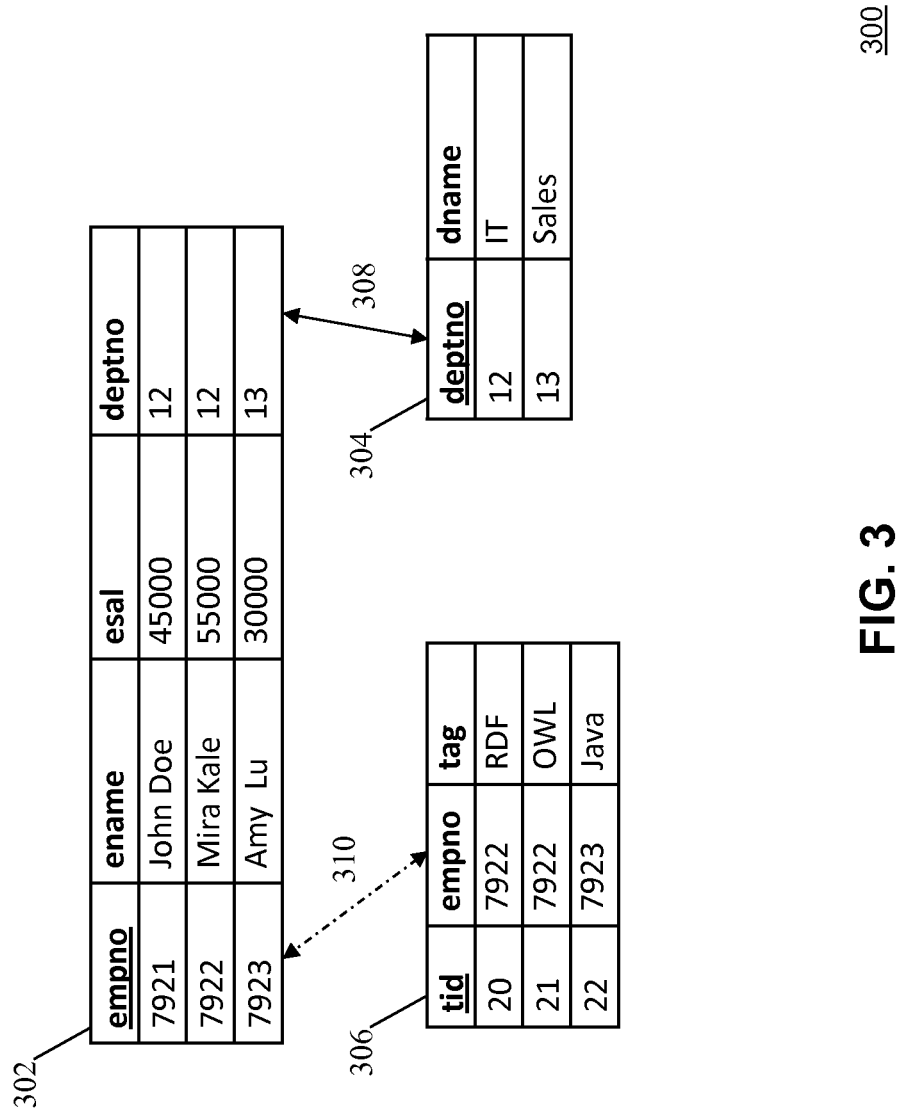
FIG. 3 illustrates an exemplary data schema 300 that may be used to create an RDF graph in accordance with some embodiments.

FIG. 3 illustrates an exemplary data schema 300 that may be used to create an RDF graph in accordance with some embodiments. Schema 300 contains three tables: an employee table (emp) 302, a department table (dept) 304, and a tags table (tags) 306. Each table comprises a plurality of columns. For example, the employee table 302 contains an employee number (empno) that serves as a primary key column, as well as additional columns corresponding to employee name (ename), employee salary (esal), and department number (deptno). The department table 304 contains a department number (deptno) column as the primary key column, as well as a column for department name (dname). Tags table 306 contains a tag ID (tid) column as the primary key column, and additional columns for employee number (empno) and tag (tag).

As illustrated in FIG. 3, an asserted referential constraint 308 exists between the deptno columns of employee table 302 and department table 304. In addition, there is an unasserted referential constraint 310 between the empno column of tags table 306 and the empno column of employee table 302. It is understood that while only three tables of relational data are shown in schema 300 for the purposes of example and ease of explanation, it is understood that the techniques disclosed herein may be applied to schemas with any number of tables, wherein the tables contain any number of columns.

Figure 4:
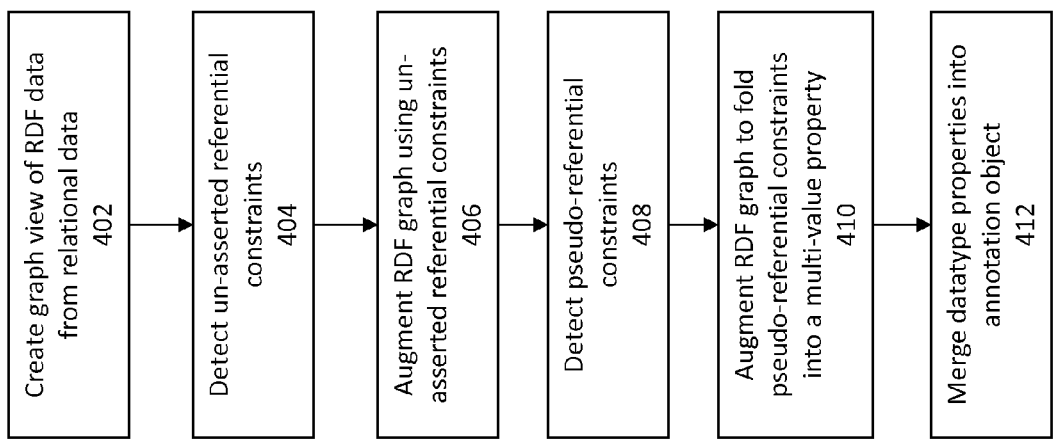
FIG. 4 illustrates a flowchart of a process for creating an RDF graph view of relational data in accordance with some embodiments.

FIG. 4 illustrates a flowchart of a process for creating an RDF graph view of relational data in accordance with some embodiments. For ease of explanation, the process will be discussed with reference to the sample data schema 300 illustrated in FIG. 3, although it is understood that the process may be applied to any relational data schema containing any number of tables.

Figure 5A:
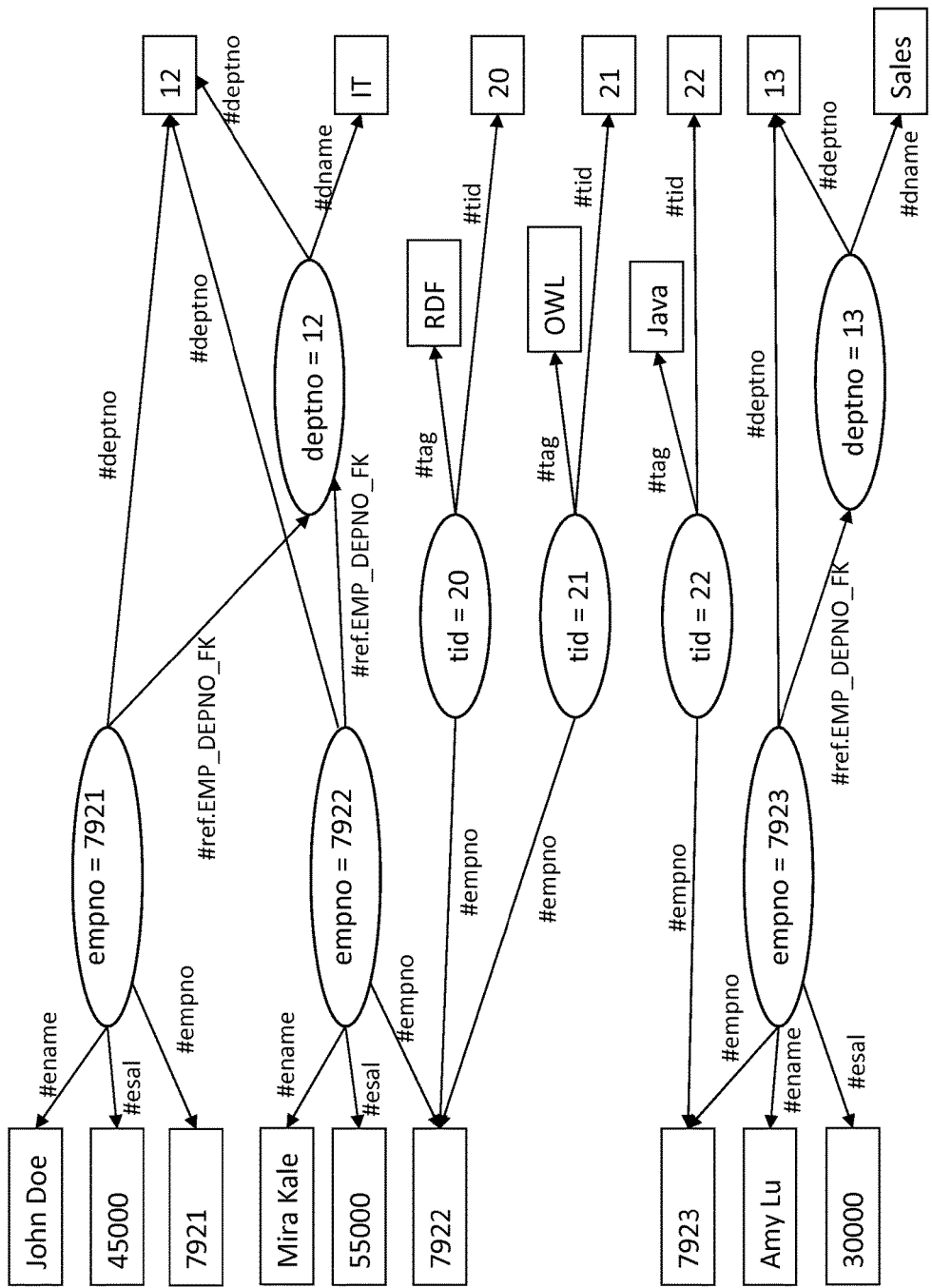
FIG. 5A illustrates an RDF graph generated from relational data using a W3C standard direct mapping specification in accordance with some embodiments.

At 402, an initial RDF graph is created from the relational data. The initial graph may be created using a standard W3C RDB2RDF direct mapping. For example, FIG. 5A illustrates a graph generated from schema 300 using a W3C standard direct mapping specification. In accordance with the mapping specification, each table is mapped to a class, wherein the primary keys of the tables are transformed into subjects, columns are transformed into properties, and table cell values are transformed to objects. This results in each table cell being transformed into an RDF triple. In some embodiments, the primary keys are represented as RDF resources, while non-primary table cell values are represented as literal values.

For example, with reference to employee table 302, the primary keys of the empno column are transformed into subject URIs (empno=7921, empno=7922, and empno=7923), while the columns ename, esal, and deptno are transformed into property URIs #ename, #esal, and #deptno, respectively. Thus, by using RDB2RDF direct mapping, an RDF view is generated on the relational data consisting of the three classes (employees, departments, and tags) and instances corresponding to the three tables respectively.

Because the referential constraint between the deptno columns of employee table 302 and department table 304 (referential constraint 308) has been asserted, the reference may be reflected in the RDF graph as edges linking the subject URIs of the related tables to form an additional set of RDF triples (e.g., empno=7921→#ref.EMP_DEPNP_FK→deptno=12). In some embodiments, as illustrated in FIG. 5A, referential constraints are object properties (the object of the RDF triple is another resource/URI from another table), whereas relationships with table cell values are represented as datatype properties (the object of the RDF triple is a literal).

At 404, after the initial RDF graph is formed, unasserted referential constraints in the schema are detected. The detected unasserted referential constraints are then used to augment the RDF graph at 406. In some embodiments, the referential properties are detected via a set of SPARQL queries, using a standard brute force Inclusion Dependency Detection algorithm. For example, primary key columns (e.g., empno of the emp table) may be compared with the non-primary columns (e.g., empno of the tags table) of other tables, to see if all values of a non-primary key column are completely contained in the primary key column. If so, an unasserted referential constraint may exist between the two columns.

For example, #empno is a referential property between instances of the tag class and the employee class that may be detected (the values of child key empno of the tags table are completely contained in the values of parent key empno of the emp table). In response to the detection of the unasserted referential property, graph edges such as 7922←#empno←tid=20 are transformed to empno=7922←#ref.TAG_EMPNO_FK←tid=20 through automatic augmentation of the default direct mapping to form a custom R2RML mapping.

Since this algorithm can produce false positives, user confirmation may be required before the graph is augmented. For example, provisional edges such as tid=21→#refd.empno=empno→empno=7922 may be presented to the user for approval. These edges allow the user to quickly verify the generated referential constraints. Confirmed referential constraints will in turn generate edges with the standard direct mapping notation (e.g., tid=21→#ref.TAG_EMPNO_FK→empno=7922).

In some embodiments, triples generated by the referential constraints can be added to the graph via R2RML fragments such as the following:

```
oraemp:TMap_TAG
    rr:predicateObjectMap [
        rr:predicate oraemp:#ref.TAG_EMPNO_FK;
        rr:objectMap [
            rr:parentTriplesMap oraemp:TMap_TAG;
            rr:joinCondition [
                rr:child "\"EMPNO\"";
                rr:parent "\"EMPNO\""
            ]
        ]
    ]
```

Figure 5B:
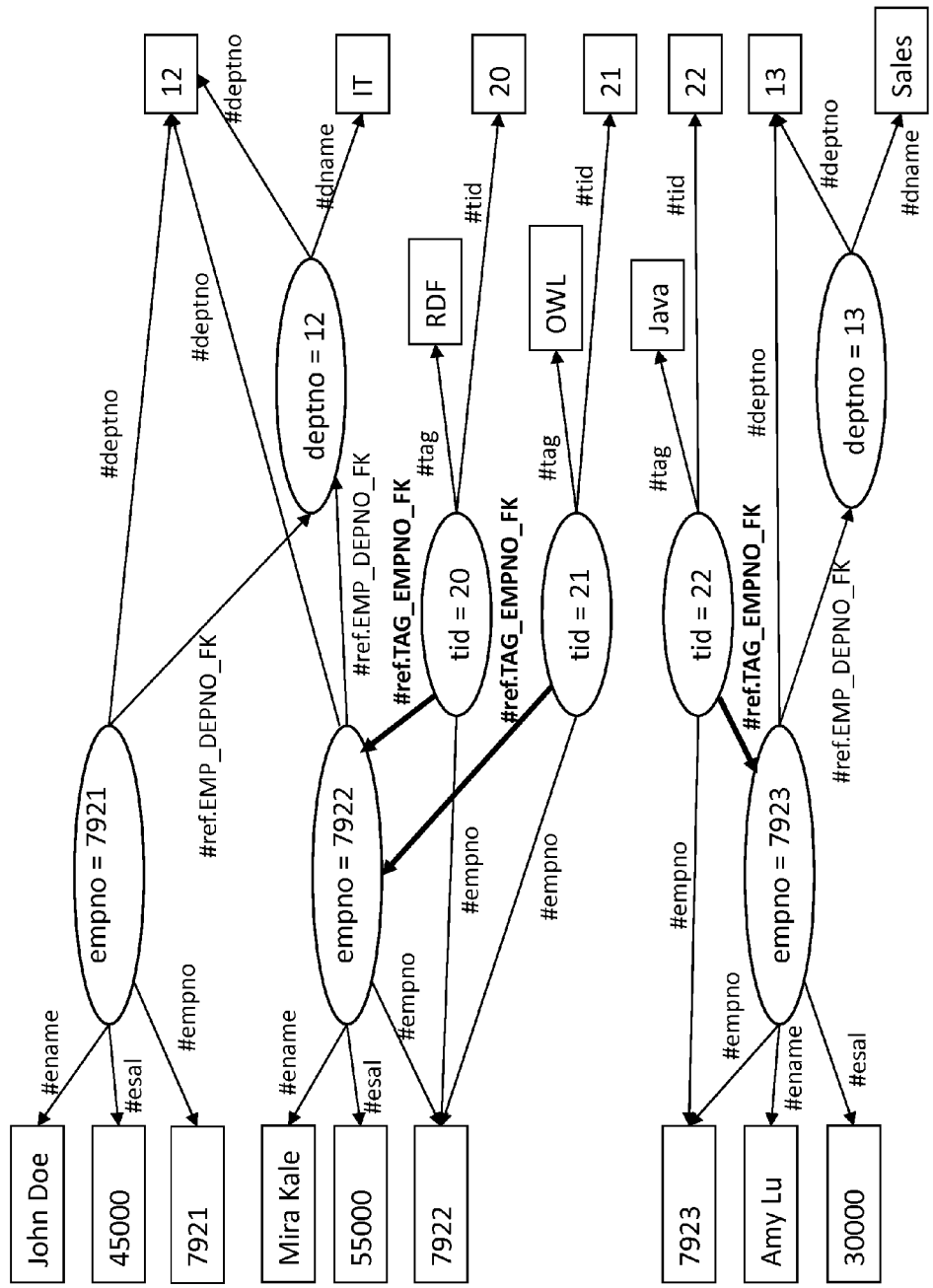
FIG. 5B illustrates an RDF graph augmented with unasserted referential constraints in accordance with some embodiments.

FIG. 5B illustrates the graph of FIG. 5A after unasserted referential constraints of schema 300 have been detected and used to modify the RDF graph, in accordance with some embodiments.

At 408, pseudo-referential constraints may be detected, and used to modify the RDF graph at 410. For example, in the schema illustrated in FIG. 3, tags are a multi-valued property of employees that is stored in its own separate table due to the normalization process when creating the relational data. Thus a pseudo-referential constraint exists between them that can be detected.

With respect to the graph illustrated in FIG. 5B, #ref.TAG_EMPNO_FK may be detected as a pseudo-referential constraint, due to tags being a multi-valued property of employees. In some embodiments, it is possible to identify #ref.TAG_EMPNO_FK as a pseudo-referential constraint because the child entity (tags) only contains 2 properties besides the primary key (tid), one matching the foreign key value (empno) and the other (tag) being a literal value type.

In some embodiments, edges corresponding to the detected pseudo-referential constraints are collapsed or folded together to form a multi-valued property. For example, through augmented custom R2RML, the two edges empno=7923←#ref.EMP_DEPNO_FK←tid=22 and tid=22→#tag→Java can be collapsed to form a single edge Java→#tag→empno=7923. This greatly reduces clutter because an occurrence of two edges and an intermediate node with its literal value is replaced by a single edge.

Figure 6:
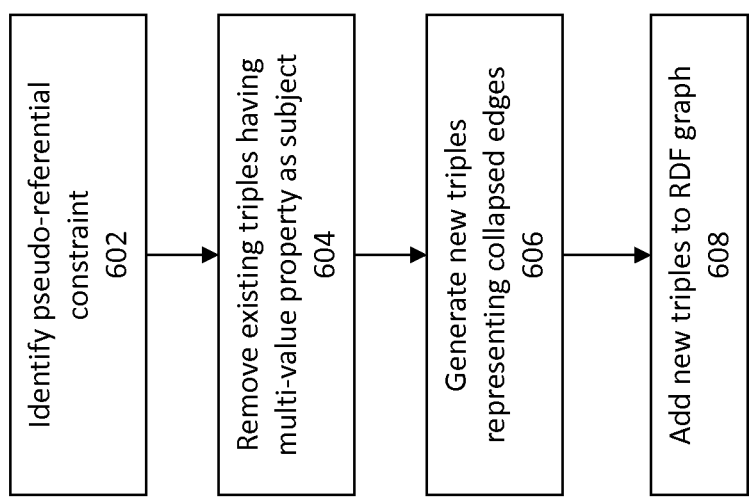
FIG. 6 illustrates a flowchart for a process for collapsing edges of the RDF graph in response to detected pseudo-referential constraints in accordance with some embodiments.

An exemplary process for modifying RDF graph in response to detected pseudo-referential constraints (step 410 of FIG. 4) is illustrated in more detail in FIG. 6. First, at 602, the pseudo-referential constraint is identified (e.g., a pseudo-referential constraint is identified between tags and employees, due to tags being a multi-valued property of employees).

At 604, triples in the RDF graph having the multi-valued property as a subject are removed. For example, all triples with a primary key of tags tid(oraemp:TMap_TAG) as a subject are removed from the mapping.

At 606, a new set of triples representing the collapsed edges is generated, and added to the RDF graph at 608. For example, a new TriplesMap may be inserted to generate the triples representing the collapsed edges (linking the employee class to tag values) using the following:

```
oraemp:empTagTab rr:sqlQuery """
    SELECT E.EMPNO, T.TAG FROM SCOTT.TAG T JOIN SCOTT.EMP
    E ON(T.EMPNO=E.EMPNO);
""" .
oraemp:TMap_Tag
    rr:logicalTable oraemp:empTagTab;
    rr:subjectMap [
    rr:template "http://xmlns.oracle.com/emp/e{EMPNO}" ];
    rr:predicateObjectMap [
    rr:predicate oraemp:#tag;
    rr:objectMap [ rr:column "TAG" ] ]
```

Figure 5C:
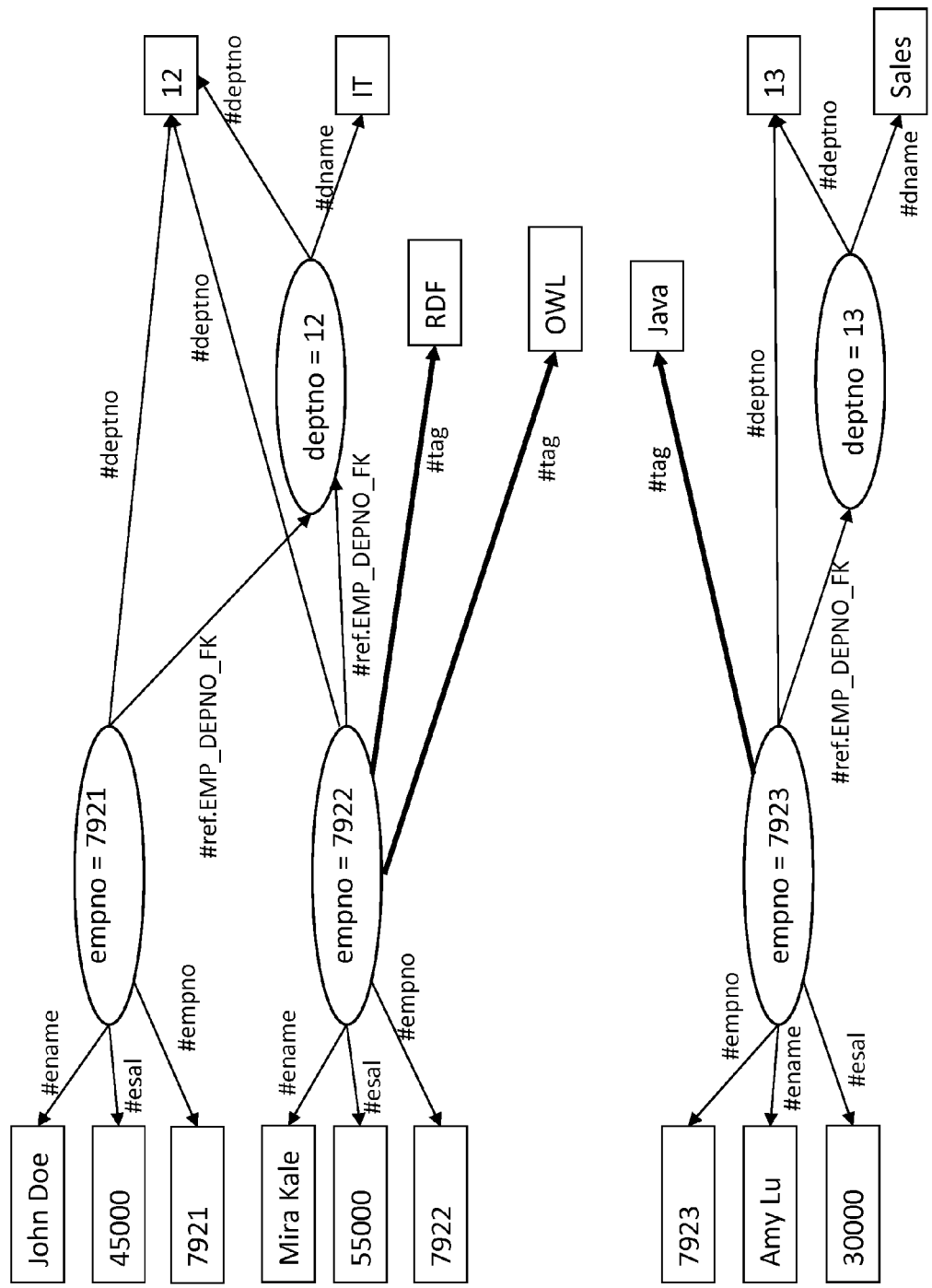
FIG. 5C illustrates an RDF graph having pseudo-referential constraints collapsed into multi-value properties in accordance with some embodiments.

Since the subject URIs of the newly generated triples match the subject URIs of the existing employees TriplesMap (e.g., the rr:template for the rr:subjectMap matches the one for the oraemp:TMap_EMP), the edges will be added directly to each of the EMP instances, effectively collapsing the edges illustrated in FIG. 5B. FIG. 5C illustrates the graph of FIG. 5B, after pseudo-referential constraints have been detected and used to augment the graph, in accordance with some embodiments.

Figure 5D:
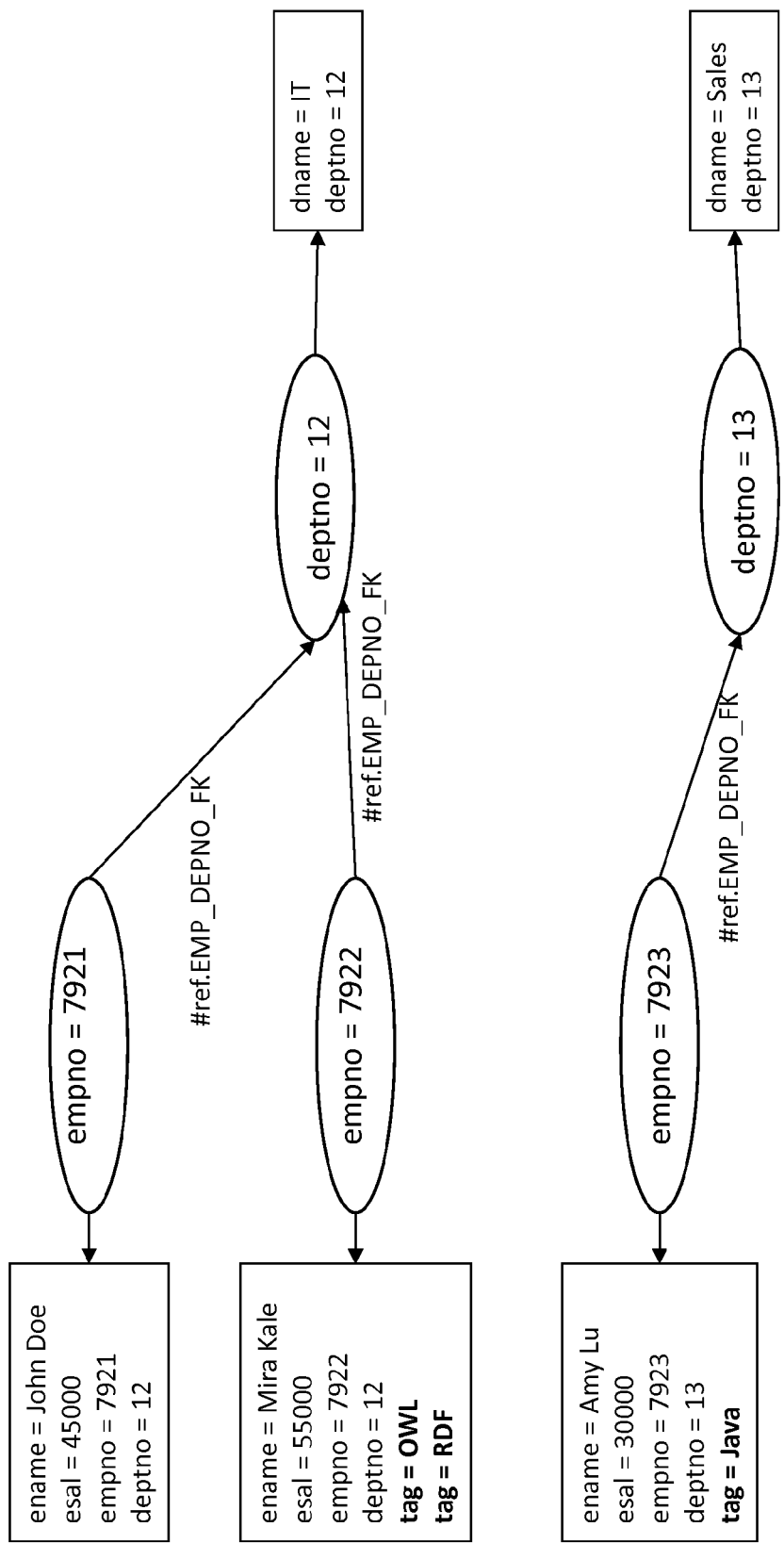
FIG. 5D illustrates an RDF graph having properties folded into annotation objects in accordance with some embodiments.

Returning to FIG. 4 at 412, in order to save screen space and ease of viewing, datatype properties (single and multi-valued) for each instance of a class may be folded into an annotation object. In some embodiments, properties and objects are formatted as a collection of key-value pairs and associated with the node. In some embodiments, the annotation objects are kept hidden by default in order to save screen space and reduce clutter, and made available on demand (e.g., a user clicking on a node in order to view its associated properties). Hiding the annotation objects also brings the referential properties between nodes to the forefront. FIG. 5D illustrates the RDF graph of FIG. 5C, after properties for each class instance having been folded into annotation objects, in accordance with some embodiments. In some embodiments, the generated RDF graph is not materialized, and is maintained as an RDF view that is kept up-to-date with the underlying relational data.

Partial Materialization of Lexical-to-ID Mappings

Once the RDF graph has been augmented and transformed (e.g., as illustrated in FIG. 5D), the actual visualization often requires interfacing with a large scale RDF visualization tool. These tools may allow a user to generate summaries, sample the data, and view particular subsets of the data. An example tool that may be used is disclosed in Seema Sundara, et al.: *Visualizing large-scale RDF data using Subsets, Summaries, and Sampling in Oracle.* ICDE 2010: 1048-1059, which is hereby incorporated by reference in its entirety.

However, these tools generally require materialized RDF data, wherein the RDF data is represented as IDs instead of lexical values. More specifically, they require a materialized a lexical-values-to-ID mapping table and a materialized ID-based RDF graph. For example, the large-scale RDF visualization tool may rely on ID-based summaries computed from an ID-based RDF graph. However, the RDF graph generated from relational data will only have lexical values generated on-demand from the underlying relational data. Thus, additional steps will need to be taken to allow the RDF graph to be used with the visualization tools.

Figure 7:
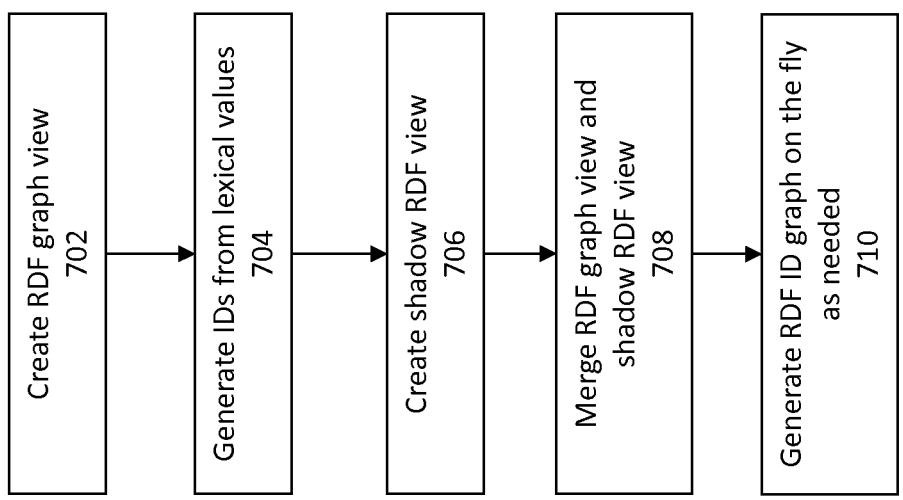
FIG. 7 illustrates a flowchart of a process for implementing a hybrid approach for partial materialization of RDF data in accordance with some embodiments

FIG. 7 illustrates a flowchart of a process for implementing a hybrid approach for partial materialization of RDF data in accordance with some embodiments. Partial materialization refers to materializing a lexical-value to ID mapping table to be used with the RDF graph, but not materializing an ID-based RDF graph. Instead, the ID-based RDF graph can be generated on-the-fly as needed, using an on-the-fly hash function on the lexical values.

At 702, the RDF graph is created as a view of the relational data (e.g., using the method described above in FIG. 4). At 704, IDs for RDF data are generated from the RDF lexical values. In some embodiments, this is done using a hashing function. Since only this mapping table is materialized, the storage overhead is less than if a full ID-based RDF graph is materialized (e.g., typically one third of full materialization). Furthermore, a fast refresh strategy can be applied on the mapping table for keeping the mapping up-to-date as underlying relational data changes.

At 706, the materialized lexical-value to hash ID mapping table is kept in sync with the changing underlying data using a fast refresh scheme. The fast refresh scheme has an execution time proportional to the size of the update, instead of the size of the entire table, to efficiently keep the materialized values table up-to-date.

In some embodiments, fast refresh is accomplished by using a second, shadow RDF View based on changes since a given snapshot. The second, shadow RDF View is created with the same structure as the main RDF View, but the shadow RDF View will only contain data for rows that have been updated since the current values table was created. The values in the shadow RDF View can be extracted with a SPARQL query, such as:

```
SELECT DISTINCT ?val
WHERE {
    { SELECT (?s AS ?val) WHERE {?s ?p ?o} }
    UNION
    { SELECT (?p AS ?val) WHERE {?s ?p ?o} }
    UNION
    { SELECT (?o AS ?val) WHERE {?s ?p ?o} }
}
```

The resulting values retrieved from the shadow RDF view can then simply be merged into the current values mapping table to bring it up-to-date with the underlying relational data at 708.

In order to define the shadow RDF View such that it only contains triples from updated rows for augmenting the Triples Maps from the base RDF View, only rows with ROWIDs that appear in a supporting changed ROWID table will be used to generate triples in the shadow RDF View. One such changed ROWID table is needed for each Triples Map. For example, for an emp table, a supporting table (e.g., emp_changed_rid_tab) is used to log which ROWIDs in the table have experienced a change since a previous update.

For example, consider the example R2RML that describes a Triples Map for the EMP table below.

```
oraemp:TMap_EMP
    rr:logicalTable [ rr:tableName "\"SCOTT\".\"EMP\"" ];
    rr:subjectMap [
        rr:template "http://xmlns.oracle.com/emp/e{EMPNO}" ];
    rr:predicateObjectMap [
        rr:predicate oraemp:ename;
        rr:objectMap [ rr:column "ENAME" ] ]
    ...
```

The corresponding shadow Triples map could be defined as follows, wherein the shadow Triples map only maps the ROWIDs that have changed since a previous snapshot or checkpoint. Because many database systems maintain snapshot logs or change logs as data is changed, the shadow RDF view is able to take advantage of the logs so that it only contains triples that have changed since a previous update.

```
oraemp:empShadowTab rr:sqlQuery """
    SELECT * FROM SCOTT.EMP
    WHERE ROWID IN
        (SELECT RID FROM SCOTT.EMP_CHANGED_RID_TAB);
""" .
oraemp:TMap_EMP_SHADOW
    rr:logicalTable oraemp:empShadowTab;
    rr:subjectMap [
        rr:template "http://xmlns.oracle.com/emp/e{EMPNO}" ];
    rr:predicateObjectMap [
        rr:predicate oraemp:ename;
        rr:objectMap [ rr:column "ENAME" ] ]
    ...
```

TMap_EMP_SHADOW will thus only generate triples for rows of the EMP table whose ROWIDs appear in the EMP_CHANGED_RID_TAB table. When syncing the mapping table with the underlying relational data, by computing the shadow RDF view that contains TMap_EMP_SHADOW to obtain the changed RDF triples, any changes to EMP_CHANGED_RID_TAB are immediately reflected in SPARQL queries against the shadow RDF View, without needing to materialize the shadow RDF View.

It is straightforward to programmatically construct a shadow Triples Map for a simple Triples Map that references a single relational table (e.g., an emp table). Note that all Triples Maps generated from a direct mapping have this characteristic. For more complicated Triples Maps that reference arbitrary SQL queries or complicated database views, a shadow Triples Map may need to be created manually.

At 710, ID-based RDF graphs are generated on the fly from the RDF view. Because large scale RDF visualization tools rely on ID-based summaries computed from an ID-based RDF graph, in order to use the lexical value based RDF graph generated using the techniques described above, it needs to be converted to an ID-based RDF graph. This may be done by applying an on-the-fly hash function on the lexical values. This is made available for creating ID-based summaries by having the extension s$RDFVID being applicable for RDF Views. Thus, a user can do a query of the form:

```
SELECT s$RDFVID
FROM TABLE (SEM_MATCH ('{?s ?p ?o}',
    SEM_MODELS ('RDF_View_on_HR'),
    NULL, NULL, NULL, NULL,
    'LEX_VID_HASH=T ')) );
```

Note that SEM_MATCH is a SQL Table function, in which a SPARQL query can be specified. Normally, the s$RDFVID will be NULL for queries over an RDF View having only lexical data. However, with the option LEX_VID_HASH=T, s$RDFVID will return Hash IDs, in this case generated on-the-fly by applying a hash function on the lexical values.

While in some embodiments the ID-based RDF graph is generated using an on-the-fly hashing function, due to the operation being relatively cheaper than joining with the lexical-values-to-ID mapping table, it is understood that in other embodiments, the ID-based RDF graph may instead be generated using the lexical-values-to-ID mapping table.

The lexical-values-to-ID mapping table may be used to return lexical values for queries by the visualization tool. For example, when manipulating the ID-based graph, the visualization tool may be used to compute one or more ID-based summary tables. When querying the ID-based summary tables, the query results may be joined with the materialized lexical-value-to-ID mapping table, so that lexical values may be quickly returned to the user.

In addition, some types of visualization operations (e.g., those that do not require access to a pre-computed ID-based summary) may be performed that directly query the RDF view using SPARQL. In some embodiments, the queries may be mapped to the underlying relational tables to directly generate lexical values that are presented to the user.

Thus, the generated RDF graphs can be used with large-scale RDF visualization tools, with less storage overhead compared to a fully materialized ID-based RDF graph.

Partition-Sensitive RDF Graphs

In addition, current standards for visualizing relational data as RDF views are partition agnostic. While many databases utilize partitions of large scale relational data, standard W3C RDB2RDF direct mapping is partitioning agnostic. Thus, when handling large scale relational data which has been partitioned by the database designer, the partitioning scheme cannot, under current specification of W3C RDB2RDF, be taken advantage of when visualizing the data.

By extending the W3C RDB2RDF direct mapping to recognize partitioned tables and transform partition key columns into RDF properties (e.g., #<partitionmethod>-part_<partitioning key column>, wherein <partitionmethod> corresponds to a type of partitioning, and <partitioning key column> corresponds to a column used as the partitioning key), the existing partitioning schema of the underlying relational data may be used when subsetting and visualizing the RDF data. This is particularly useful in cases where there is a large amount of historical data, but the user is only interested in viewing a certain data subset.

Figure 8:
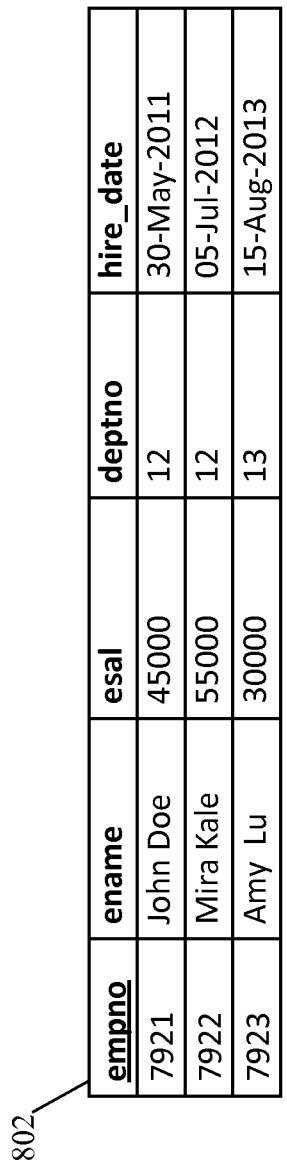
FIG. 8 illustrates an employee table having a hire_date column upon which it is partitioned, in accordance with some embodiments.

FIG. 8 illustrates an employee table 802 having a hire_date column, upon which the table is partitioned using a range partitioning method. For example, table 802 may be partitioned as follows:

```
CREATE TABLE emp (...)
PARTITION BY RANGE (hire_date)
( PARTITION hire_date_2011
VALUES LESS THAN (TO_DATE ('31-Mar-2011', 'DD-MON-YYYY')),
PARTITION hire_date_2012
VALUES LESS THAN (TO_DATE ('31-Mar-2012', 'DD-MON-YYYY')),
PARTITION hire_date_2013
VALUES LESS THAN (TO_DATE ('01-JAN-2013', 'DD-MON-YYYY'));
```

Direct mapping as defined in the W3C standard will treat the entire table as a single unit, not recognizing the individual partitions. While a user may be able to write their own SPARQL queries against the data to restrict it to certain subsets, it is done without knowledge of any existing partitions in the relational data schema. The user thus cannot take advantage of the partitioning already implemented in the relational data when visualizing the data as RDF graphs.

Figure 9:
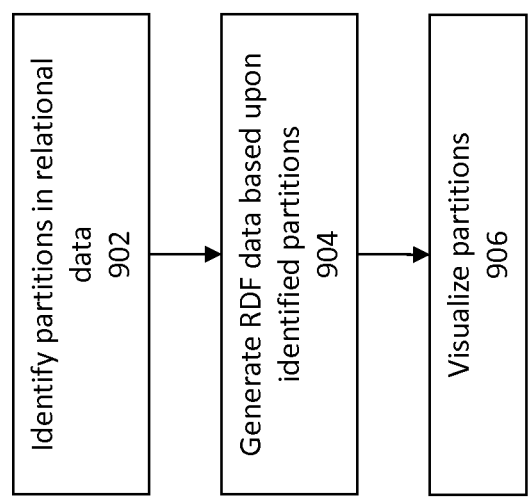
FIG. 9 illustrates a flowchart of a process for creating partition-sensitive RDF graphs in accordance with some embodiments.

By creating partition-sensitive RDF graphs, users will be able to query specific partitions of the data. In addition, the visualization tool may also be able to build partition-specific ID-based summaries, to be used when a user is only interested in data pertaining to a specific partition or partitions. Such functions may be particularly useful when dealing with historical data. FIG. 9 illustrates a flowchart of a process for creating partition-sensitive RDF graphs in accordance with some embodiments. At 902, partitioning in the relational data scheme is recognized. This may comprise recognizing a particular column (e.g., hire_date) as a partition-key column.

At 904, the identified partition information is used to generate corresponding RDF data. For example, the partitioning data may be used to generate additional RDF triples having a special property (e.g., #range-part_hire_date). Thus, SPARQL queries can make use of that property to restrict data to specific partitions.

In addition, the partition bounds are made available as metadata, which can be queried via SPARQL. This is done by exposing portions of the data dictionary views on partitioned tables as part of direct mapping. For the above example, the partitioning metadata could be exposed by including the following view.

```
SELECT table_name, partitioning_type
FROM user_part_tables
WHERE owner='SCOTT' AND table_name ='EMP';
```

Similarly, the partition bounds could be made available by including the following view:

```
SELECT table_name, partition_name,
partition_position, high_value
FROM user_tab_partitions
WHERE table_owner='SCOTT' AND table_name='EMP';
```

At 906, the partitioning information, which has been converted to RDF form, can now be used to visualize an RDF graph. By taking advantage the partition-aware transformation in the visualization tool, users may be provided the option of starting visualization from the partitioned table or its individual partitions. This is made possible due to the tool being able to issue SPARQL queries to get partition specific information and can build partition-specific summaries as well.

System Architecture Overview

Figure 10:
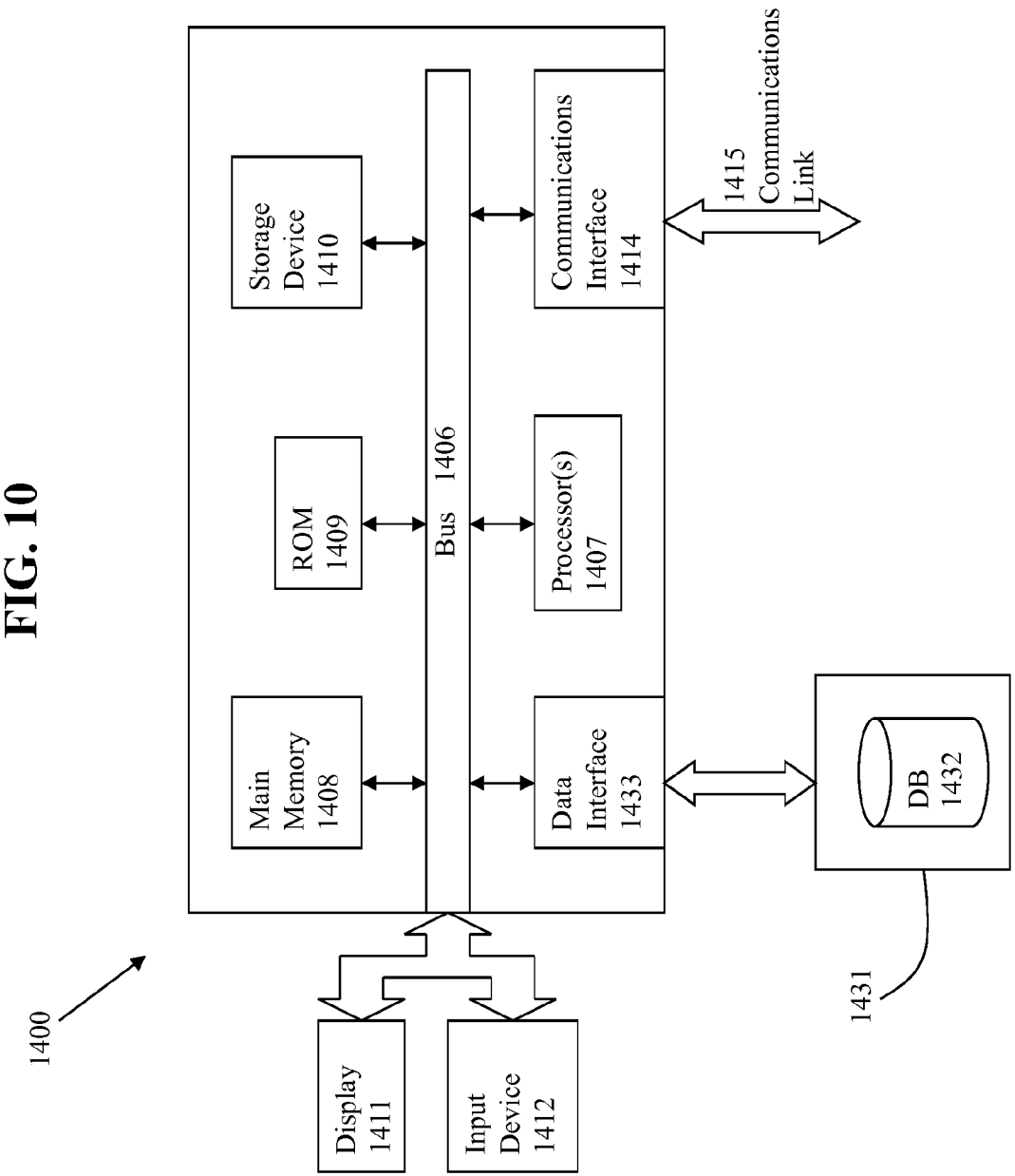
FIG. 10 illustrates a computerized system on which an embodiment of the invention can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for generating resource description framework (RDF) views of relational data for the purpose of visualizing relational data as a graph on a display, comprising:
   receiving relational data;
   creating an RDF graph corresponding to an RDF view of the relational data;
   detecting one or more referential constraints in the relational data;
   augmenting the RDF graph based at least in part upon the referential constraints, by:
      identifying unasserted referential constraints,
      updating the RDF graph to include new edges based on the unasserted referential constraints,
      identifying pseudo-referential constraints, wherein pseudo-referential constraints are constraints that correspond to multi-valued properties, and
      updating the RDF graph by collapsing a plurality of edges corresponding to the pseudo-referential constraint into a single edge;
   combining properties associated with nodes of the RDF graph into annotation objects associated with the nodes, the annotation objects comprising one or more key-value pairs; and
   displaying the RDF graph to a user, the RDF graph comprising at least one or more nodes associated with annotation objects having multiple properties combined into key-value pairs.

2. The method of claim 1, wherein the RDF graph is an edge-node graph having nodes corresponding to table rows and edges corresponding to referential constraints between table rows.

3. The method of claim 1, wherein the one or more referential constraints comprises an unasserted referential constraint and the unasserted referential constraint comprises at least a constraint that is not expressly represented in metadata indicating a referential relationship between tables.

4. The method of claim 3, further comprising:
   displaying a prospective unasserted referential constraint to the user; and
   receiving a confirmation from the user regarding the prospective unasserted referential constraint.

5. The method of claim 1, wherein augmenting the RDF graph comprises adding one or more RDF triples to the RDF graph based at least in part upon the unasserted referential constraint.

6. The method of claim 1, wherein the one or more referential constraints comprises a pseudo-referential constraint, wherein the pseudo-referential constraint indicates a multi-valued property that is stored in a separate table and is generated as a result of a normalization process when creating the relational data.

7. The method of claim 6, wherein augmenting the RDF graph comprises:
   generating one or more additional RDF triples corresponding to the multi-valued property; and
   augmenting the RDF graph using the additional RDF triples.

8. The method of claim 2, further comprising:
   combining single and multi-value properties associated with a node of the RDF graph into an annotation object associated with the node that can be displayed on demand.

9. The method of claim 1, further comprising:
   forming a mapping table that maps RDF lexical values of the RDF graph to corresponding RDF identifiers; and
   generating an identifier-based RDF graph on the fly using the mapping table.

10. The method of claim 9, further comprising:
    creating a shadow RDF view, wherein the shadow RDF view maps RDF triples to rows of relational data that have changed since a previous update; and
    updating the mapping table based at least in part upon the shadow RDF view.

11. The method of claim 1, further comprising:
    identifying one or more partitions in the relational data; and
    generating one or more RDF triples corresponding to the identified partitions,
    wherein the RDF graph is created based at least in part upon the generated one or more RDF triples.

12. A computer readable medium having stored thereon a sequence of instructions for generating resource description framework (RDF) views of relational data for the purpose of visualizing relational data as a graph on a display, which when executed by a processor causes the processor to execute:
    receiving relational data;
    creating an RDF graph corresponding to an RDF view of the relational data;
    detecting one or more referential constraints in the relational data;
    augmenting the RDF graph based at least in part upon the referential constraints, by:
       identifying unasserted referential constraints,
       updating the RDF graph to include new edges based on the unasserted referential constraints,
       identifying pseudo-referential constraints, wherein pseudo-referential constraints are constraints that correspond to multi-valued properties, and
       updating the RDF graph by collapsing a plurality of edges corresponding to the pseudo-referential constraint into a single edge;
    combining properties associated with nodes of the RDF graph into annotation objects associated with the nodes, the annotation objects comprising one or more key-value pairs; and
    displaying the RDF graph to a user, the RDF graph comprising at least one or more nodes associated with annotation objects having multiple properties combined into key-value pairs.

13. The computer readable medium of claim 12, wherein the RDF graph is an edge-node graph having nodes corresponding to table rows and edges corresponding to referential constraints between table rows.

14. The computer readable medium of claim 12, wherein the one or more referential constraints comprises an unasserted referential constraint and the unasserted referential constraint comprises at least a constraint that is not expressly represented in metadata indicating a referential relationship between tables.

15. The computer readable medium of claim 14, wherein the sequence of instructions, when executed by the processor causes the processor to further execute:
    displaying a prospective unasserted referential constraint to the user; and
    receiving a confirmation from the user regarding the prospective unasserted referential constraint.

16. The computer readable medium of claim 12, wherein augmenting the RDF graph comprises adding one or more RDF triples to the RDF graph based at least in part upon the unasserted referential constraint.

17. The computer readable medium of claim 12, wherein the one or more referential constraints comprises a pseudo-referential constraint, wherein the pseudo-referential constraint indicates a multi-valued property that is stored in a separate table and is generated as a result of a normalization process when creating the relational data.

18. The computer readable medium of claim 17, wherein augmenting the RDF graph comprises:
    generating one or more additional RDF triples corresponding to the multi-valued property; and
    augmenting the RDF graph using the additional RDF triples.

19. The computer readable medium of claim 13, wherein the sequence of instructions, when executed by the processor causes the processor to further execute:
    combining single and multi-value properties associated with a node of the RDF graph into an annotation object associated with the node that can be displayed on demand.

20. The computer readable medium of claim 12, wherein the sequence of instructions, when executed by the processor causes the processor to further execute:
    forming a mapping table that maps RDF lexical values of the RDF graph to corresponding RDF identifiers; and
    generating an identifier-based RDF graph on the fly using the mapping table.

21. The computer readable medium of claim 20, wherein the sequence of instructions, when executed by the processor causes the processor to further execute:
    creating a shadow RDF view, wherein the shadow RDF view maps RDF triples to rows of relational data that have changed since a previous update; and
    updating the mapping table based at least in part upon the shadow RDF view.

22. The computer readable medium of claim 12, wherein the sequence of instructions, when executed by the processor causes the processor to further execute:
    identifying one or more partitions in the relational data; and
    generating one or more RDF triples corresponding to the identified partitions,
    wherein the RDF graph is created based at least in part upon the generated one or more RDF triples.

23. A system for generating resource description framework (RDF) views of relational data for the purpose of visualizing relational data as a graph on a display, comprising:
    a processor;
    a memory comprising computer code executed using the processor, in which the computer code implements:
    receiving relational data;
    creating an RDF graph corresponding to an RDF view of the relational data;
    detecting one or more referential constraints in the relational data;
    augmenting the RDF graph based at least in part upon the referential constraints, by:
        identifying unasserted referential constraints,
        updating the RDF graph to include new edges based on the unasserted referential constraints,
        identifying pseudo-referential constraints, wherein pseudo-referential constraints are constraints that correspond to multi-valued properties, and
        updating the RDF graph by collapsing a plurality of edges corresponding to the pseudo-referential constraint into a single edge;
    combining properties associated with nodes of the RDF graph into annotation objects associated with the nodes, the annotation objects comprising one or more key-value pairs; and
    displaying the RDF graph to a user, the RDF graph comprising at least one or more nodes associated with annotation objects having multiple properties combined into key-value pairs.

24. The system of claim 23, wherein the RDF graph is an edge-node graph having nodes corresponding to table rows and edges corresponding to referential constraints between table rows.

25. The system of claim 23, wherein the one or more referential constraints comprises an unasserted referential constraint and the unasserted referential constraint comprises at least a constraint that is not expressly represented in metadata indicating a referential relationship between tables.

26. The system of claim 25, wherein the computer code further implements:
    displaying a prospective unasserted referential constraint to the user; and
    receiving a confirmation from the user regarding the prospective unasserted referential constraint.

27. The system of claim 23, wherein augmenting the RDF graph comprises adding one or more RDF triples to the RDF graph based at least in part upon the unasserted referential constraint.

28. The system of claim 23, wherein the one or more referential constraints comprises a pseudo-referential constraint, wherein the pseudo-referential constraint indicates a multi-valued property that is stored in a separate table and is generated as a result of a normalization process when creating the relational data.

29. The system of claim 28, wherein augmenting the RDF graph comprises:
    generating one or more additional RDF triples corresponding to the multi-valued property; and
    augmenting the RDF graph using the additional RDF triples.

30. The system of claim 24, wherein the computer code further implements:
    combining single and multi-value properties associated with a node of the RDF graph into an annotation object associated with the node that can be displayed on demand.

31. The system of claim 23, wherein the computer code further implements:
    forming a mapping table that maps RDF lexical values of the RDF graph to corresponding RDF identifiers; and
    generating an identifier-based RDF graph on the fly using the mapping table.

32. The system of claim 31, wherein the computer code further implements:
    creating a shadow RDF view, wherein the shadow RDF view maps RDF triples to rows of relational data that have changed since a previous update; and
    updating the mapping table based at least in part upon the shadow RDF view.

33. The system of claim 23, wherein the computer code further implements:
    identifying one or more partitions in the relational data; and generating one or more RDF triples corresponding to the identified partitions,
wherein the RDF graph is created based at least in part upon the generated one or more RDF triples.

* * * * *

UNITED STATES PATENT AND TRADEMARK OFFICE
CERTIFICATE OF CORRECTION

PATENT NO. : 9,785,725 B2
APPLICATION NO. : 14/498709
DATED : October 10, 2017
INVENTOR(S) : Srinivasan et al.

It is certified that error appears in the above-identified patent and that said Letters Patent is hereby corrected as shown below:

In the Specification

In Column 3, Line 7, after "embodiments" insert -- . --.

In Column 12, Line 47, delete "PTSN," and insert -- PSTN, --, therefor.

Signed and Sealed this
Twenty-ninth Day of May, 2018

Andrei Iancu
*Director of the United States Patent and Trademark Office*